US012482405B2

(12) United States Patent
Wu et al.

(10) Patent No.: US 12,482,405 B2
(45) Date of Patent: Nov. 25, 2025

(54) SPLICED DISPLAY DEVICE AND BRIGHTNESS CONTROL METHOD THEREOF

(71) Applicant: AUO Corporation, Hsinchu (TW)

(72) Inventors: Yueh-Chi Wu, Hsinchu (TW); Chia-Jung Wu, Hsinchu (TW); Ti-Kuei Yu, Hsinchu (TW); Ya-Ling Hsu, Hsinchu (TW)

(73) Assignee: AUO CORPORATION, Hsinchu (TW)

( * ) Notice: Subject to any disclaimer, the term of this patent is extended or adjusted under 35 U.S.C. 154(b) by 0 days.

(21) Appl. No.: 18/910,645

(22) Filed: Oct. 9, 2024

(65) Prior Publication Data

US 2025/0252887 A1 Aug. 7, 2025

(30) Foreign Application Priority Data

Feb. 2, 2024 (TW) ................................ 113104268

(51) Int. Cl.
*G09G 3/22* (2006.01)
*G09G 3/20* (2006.01)
(Continued)

(52) U.S. Cl.
CPC ............ *G09G 3/22* (2013.01); *G09G 3/2007* (2013.01); *G09G 3/32* (2013.01); *G09G 3/36* (2013.01);
(Continued)

(58) Field of Classification Search
CPC ...... G09G 3/2007; G09G 3/2092; G09G 3/32; G09G 3/3648; G09G 5/14;
(Continued)

(56) References Cited

U.S. PATENT DOCUMENTS 7,355,580 B2 * 4/2008 Shen .................... G09G 3/2011 345/94
8,452,119 B2 * 5/2013 Arashima .............. H04N 5/144 345/204
(Continued)

FOREIGN PATENT DOCUMENTS

CN 106847157 A 6/2017
CN 108281107 A 7/2018
(Continued)

*Primary Examiner* — Michael J Jansen, II
(74) *Attorney, Agent, or Firm* — WPAT, PC

(57) ABSTRACT

A brightness control method of a spliced display device is provided. The spliced display device includes display units, and each display unit includes a LED display area and an LCD area. The brightness control method includes obtaining a current grayscale value of a current frame and a target grayscale value of a target frame in the LCD area, wherein the target frame is the frame next to the current frame; obtaining a response time required to convert the current grayscale value into the target grayscale value of the LCD area; and adjusting a target grayscale value of the LED area to an actual grayscale value during the target frame according to the response time. During the target frame, the brightness emitted by the LED display area based on the actual grayscale value is the same as the brightness emitted by the LCD area based on the target grayscale value.

16 Claims, 5 Drawing Sheets

(51) Int. Cl.
*G09G 3/32* (2016.01)
*G09G 3/36* (2006.01)
*G09G 5/14* (2006.01)

(52) U.S. Cl.
CPC ......... *G09G 3/2092* (2013.01); *G09G 3/3648* (2013.01); *G09G 5/14* (2013.01); *G09G 2300/026* (2013.01); *G09G 2320/0233* (2013.01); *G09G 2320/0252* (2013.01); *G09G 2360/04* (2013.01)

(58) Field of Classification Search
CPC ..... G09G 2300/026; G09G 2320/0233; G09G 2320/0252; G09G 2360/04; G09G 3/22; G09G 3/36
See application file for complete search history.

(56) References Cited

U.S. PATENT DOCUMENTS

| | | | | |
|---|---|---|---|---|
| 9,077,986 | B2 * | 7/2015 | Singh | H04N 13/395 |
| 11,069,307 | B2 * | 7/2021 | Cheng | G09G 3/3426 |
| 11,495,163 | B2 * | 11/2022 | Wang | G09G 3/2074 |
| 11,592,718 | B2 * | 2/2023 | Wang | B60K 35/10 |
| 11,961,484 | B2 * | 4/2024 | Yang | G09G 3/32 |
| 12,027,093 | B2 * | 7/2024 | Chu | G06F 3/1446 |
| 12,314,624 | B2 * | 5/2025 | Xia | G06T 7/0002 |
| 2005/0275645 | A1 * | 12/2005 | Shen | G09G 3/2011 345/204 |
| 2009/0091588 | A1 * | 4/2009 | Chen | G09G 3/3648 345/601 |
| 2010/0098349 | A1 * | 4/2010 | Arashima | H04N 5/142 382/263 |
| 2011/0249026 | A1 * | 10/2011 | Singh | G09G 3/36 345/630 |
| 2020/0342819 | A1 * | 10/2020 | Cheng | G09G 3/342 |
| 2021/0366411 | A1 * | 11/2021 | Yang | G09G 5/026 |
| 2021/0405410 | A1 * | 12/2021 | Wang | B60K 35/80 |
| 2022/0180793 | A1 * | 6/2022 | Wang | G09G 3/3607 |
| 2023/0259320 | A1 * | 8/2023 | Xia | G06T 7/90 345/589 |
| 2024/0153430 | A1 * | 5/2024 | Chu | G09G 5/10 |
| 2025/0095534 | A1 * | 3/2025 | Wu | G09G 3/20 |

FOREIGN PATENT DOCUMENTS

| | | | |
|---|---|---|---|
| CN | 109036290 | A | 12/2018 |
| CN | 111402825 | A | 7/2020 |
| CN | 111554246 | A | 8/2020 |

* cited by examiner

| Grayscale Conversion Response Time (ms) | | Target Grayscale Value | | | | | | | | |
|---|---|---|---|---|---|---|---|---|---|---|
| | | L0 | L32 | L64 | L96 | L128 | L160 | L192 | L224 | L255 |
| Current Grayscale Value | L0 | | 29.9 | 17.9 | 15.9 | 11.4 | 9.8 | 9.2 | 6.3 | 5 |
| | L32 | 1.8 | | 17.5 | 11.7 | 11 | 8.3 | 7.2 | 6.1 | 5.1 |
| | L64 | 1.6 | 11 | | 11.8 | 11.3 | 7.7 | 7 | 6.1 | 3.4 |
| | L96 | 1.6 | 9.4 | 9.1 | | 11.9 | 7.8 | 6.8 | 6.1 | 2.9 |
| | L128 | 1.6 | 7.5 | 8.2 | 8 | | 7.8 | 6.7 | 6.1 | 2.6 |
| | L160 | 1.7 | 6.6 | 7.4 | 7.3 | 5.9 | | 6.5 | 5.7 | 2.3 |
| | L192 | 1.8 | 6 | 6.8 | 6.9 | 6.6 | 6.7 | | 6.2 | 2.2 |
| | L224 | 1.8 | 5.5 | 6.4 | 6.9 | 6.5 | 6.4 | 5.6 | | 2 |
| | L255 | 2 | 5.2 | 6.3 | 6.4 | 6.4 | 6.4 | 4.9 | 3.5 | |

FIG. 2

SPLICED DISPLAY DEVICE AND BRIGHTNESS CONTROL METHOD THEREOF

RELATED APPLICATIONS

This application claims priority to Taiwan Application Serial Number 113104268, filed Feb. 2, 2024, which is herein incorporated by reference.

BACKGROUND

Technical Field

The present disclosure relates to a spliced display device and a brightness control method thereof, and more particularly to a spliced display device including a light emitting diode (LED) display area and a liquid crystal display (LCD) area, and a control method for controlling a display brightness of the spliced display device.

Description of Prior Art

With the vigorous development of display technologies, many applications often require larger display areas. A conventional method is to splice a plurality of liquid crystal display (LCD) panels to achieve a large panel display. But seams or frame edges between the LCD panels cannot be eliminated completely, resulting in a decline in the overall visual quality. An existing solution is to splice a LED display panel between the LCD panels, so that the LED display panel and the LCD panels can display a screen together, which can eliminate a problem that seamless splicing between the LCD panels cannot be achieved.

However, when frames of a spliced display device performs are converted, since the LED display panel and the LCD panel are different in terms of display mode and drive circuit, the grayscale conversion response times of the two are different. As a result, the overall display screen of the spliced display device will have a tearing sensation when the frames are converted, thereby affecting the display effect of the screen.

SUMMARY

Accordingly, the present disclosure provides a brightness control method of a spliced display device. The spliced display device comprises a plurality of display units, and each of the display units comprises a light-emitting diode (LED) display area and a liquid crystal display (LCD) area. The method comprises obtaining a current grayscale value of a current frame in the LCD area; obtaining a target grayscale value of a target frame in the LCD area, wherein the target frame is the frame next to the current frame; obtaining a response time required to convert the current grayscale value into the target grayscale value of the LCD area; and adjusting a target grayscale value of the LED display area to an actual grayscale value during the target frame according to the response time, wherein during the target frame, the brightness emitted by the LED display area based on the actual grayscale value is the same as the brightness emitted by the LCD area based on the target grayscale value.

According to one embodiment of the present disclosure, the current frame is a first frame, the target frame is a second frame, the actual grayscale value is used as a current grayscale value of the second frame in the LCD area, and the brightness control method further comprises reading a target grayscale value of a third frame in the LCD area, where the third frame is the frame next to the second frame; obtaining a response time required to convert the current grayscale value of the second frame in the LCD area into the target grayscale value of the third frame in the LCD area; and adjusting a target grayscale value of the LED display area to an actual grayscale value during the third frame according to the response time; wherein during the third frame, the brightness emitted by the LED display area based on the actual grayscale value is the same as the brightness emitted by the LCD area based on the target grayscale value.

According to one embodiment of the present disclosure, the brightness control method further comprises building a grayscale conversion response timetable to obtain the response time to convert the current grayscale value into the target grayscale value of the LCD area, wherein a longitudinal axis of the grayscale conversion response timetable comprises a plurality of current grayscale values, a horizontal axis comprises a plurality of target grayscale values, and the plurality of current grayscale values correspond to each of the plurality of target grayscale values to build a plurality of response time values.

According to one embodiment of the present disclosure, the response time comprises a response time curve that corresponds to time-to-grayscale values, and the step of adjusting the target grayscale value of the LED display area to an actual grayscale value during the target frame according to the response time further comprises: calculating an effective brightness area of the response time curve during the target frame as the actual grayscale value.

According to one embodiment of the present disclosure, a calculation interval of the effective brightness area is from a starting time point of the target frame to an ending time point of the target frame.

According to one embodiment of the present disclosure, the response time for converting the current grayscale value of the LCD area to the target grayscale value is greater than a display period of the target frame.

According to one embodiment of the present disclosure, the response time is the time required to convert the current grayscale value to 10% to 90% of the target grayscale value.

According to one embodiment of the present disclosure, the LED display area comprises a plurality of LEDs, and the plurality of LEDs are one of a micro LED, a submillimeter LED, and an organic LED.

The present disclosure provides a spliced display device which comprises a plurality of display units, and each of the display units comprises a light-emitting diode (LED) display area, a liquid crystal display (LCD) area and a timing controller. The LCD area is spliced with the LED display area. The timing controller is configured to perform following steps including obtaining a current grayscale value of a current frame in the LCD area; obtaining a target grayscale value of a target frame in the LCD area; obtaining a response time required to convert the current grayscale value into the target grayscale value of the LCD area; and adjusting a target grayscale value of the LED display area to an actual grayscale value during the target frame according to the response time, wherein during the target frame, the brightness emitted by the LED display area based on the actual grayscale value is the same as the brightness emitted by the LCD area based on the target grayscale value.

According to one embodiment of the present disclosure, the response time comprises a response time curve that corresponds to time-to-grayscale values.

According to one embodiment of the present disclosure, the response time curve comprises an effective brightness area during a display period of the target frame, and the effective brightness area is taken as the actual grayscale value.

According to one embodiment of the present disclosure, a calculation interval of the effective brightness area is from a starting time point of the target frame to an ending time point of the target frame.

According to one embodiment of the present disclosure, the response time to convert the current grayscale value of the LCD area into the target grayscale value is greater than the display period of the target frame.

According to one embodiment of the present disclosure, the timing controller further comprises a memory. The memory is configured to store a grayscale conversion response timetable, wherein a longitudinal axis of the grayscale conversion response timetable contains a plurality of current grayscale values, a horizontal axis contains a plurality of target grayscale values, and the plurality of current grayscale values correspond to each of the plurality of target grayscale values to build a plurality of response time values.

According to one embodiment of the present disclosure, the response time is the time required to convert the current grayscale value to 10% to 90% of the target grayscale value.

According to one embodiment of the present disclosure, the LED display area comprises a plurality of LEDs, and the plurality of LEDs are one of a micro LED, a submillimeter LED, and an organic LED.

BRIEF DESCRIPTION OF THE DRAWINGS

For a clearer and easier understanding of the above and other objects, features, advantages, and embodiments of the present disclosure, the drawings are described below:

FIG. 2 is a schematic diagram of a grayscale conversion response timetable according to embodiments of the present disclosure;

DETAILED DESCRIPTION

Figure 1:
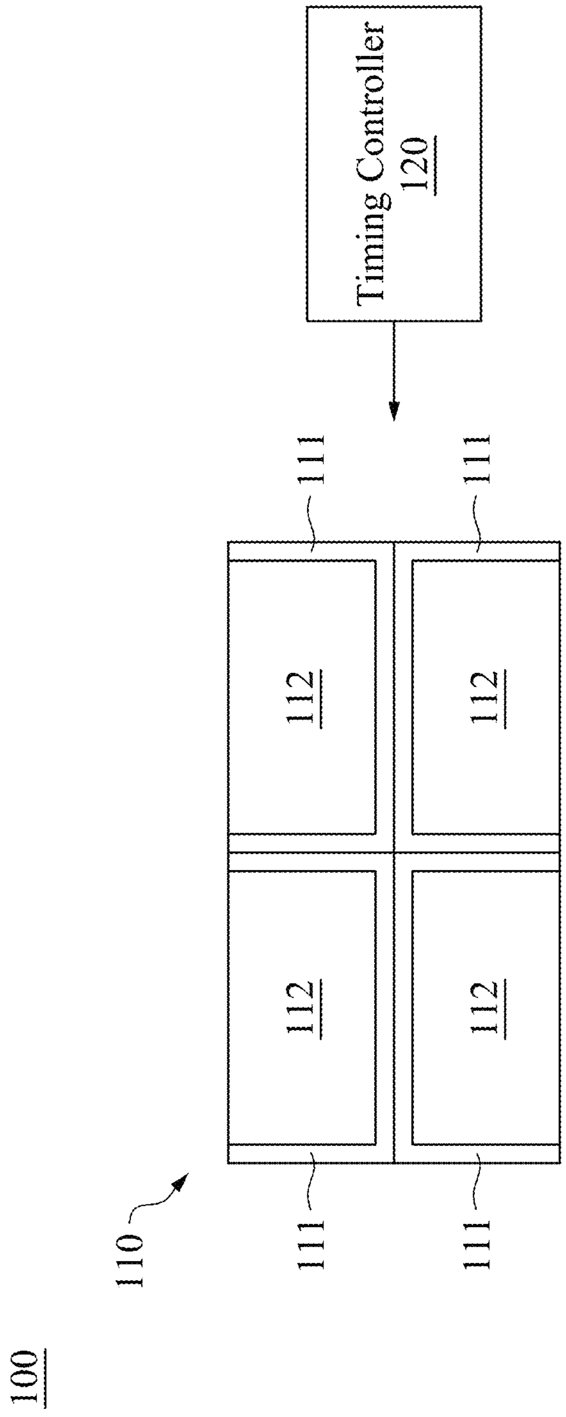
FIG. 1 is a schematic diagram of a spliced display device according to embodiments of the present disclosure.

Various different embodiments or examples are provided below for implementing different features of the provided disclosure. The embodiments of components and configurations described below are examples only and are not intended to be restrictive. In addition, for the purpose of simplification and clarity, the present disclosure repeats reference numerals and/or numbers in each example in the present disclosure, and this repetition does not in itself limit the relationship between various embodiments and/or components discussed.

Referring to FIG. 1, FIG. 1 is a schematic diagram of a spliced display device 100 according to embodiments of the present disclosure. The spliced display device 100 includes a plurality of display units (not shown), and each of the display units includes a light-emitting diode (LED) display area 111, a liquid crystal display (LCD) area 112 and a timing controller 120, where one of the display units can substantially be a single display. In a single display unit, the LED display area 111 can surround the LCD area 112.

The spliced display device 100 includes a display area 110, where the display area 110 is substantially a panel screen of the spliced display device 100 to display an image. These display units are spliced with each other, so the display area 110 is formed by splicing the LED display areas 111 with the LCD areas 112. The LED display area 111 is distributed between each two of the LCD areas 112 for seamless splicing. It should be understood that the arrangement form or the number of splices between the LED display areas 111 and the LCD areas 112 may vary as needed, and the present disclosure is not limited thereto.

In the following embodiment, the LED display area 111 is a micro LED (μLED) display area. In other embodiments, the LED display area 111 may be a mini LED display area, an organic LED (OLED) display area, or the like, but the present disclosure is not limited thereto.

In particular, compared to the LCD area 112 that is driven by voltage, the μLED display area, the mini LED display area and the OLED display area are light-emitting elements driven by current. Therefore, the μLED, the mini LED display area and the OLED display area have faster response times than the LCD area 112. When the LCD area 112 is spliced with any of the μLED display area, the mini LED display area and the OLED display area, display frames when being converted will have a tearing sensation due to their inconsistent response times.

For the sake of brevity, a graphics processing unit (GPU) or central processing unit (CPU) is omitted in FIG. 1. The GPU or CPU is electrically connected to the timing controller 120, and is configured to input image data of each frame into the timing controller 120. The image data is used to specify the grayscale values of the LCD areas 112 and the LED display areas 111 during each frame.

In addition, display drivers (e.g., a source driving circuit and a gate driving circuit) electrically connected between the display area 110 and the timing controller 120 are omitted in FIG. 1, which are configured to drive each of LEDs or liquid crystals in the display area 110, so that the display area 110 of the spliced display device 100 emits a desired brightness. It should be understood that the GPU/CPU and the display drivers are common technical elements in the display device and thus are not described in detail herein.

The timing controller 120 receives image data from the GPU or CPU to read a grayscale value of a current frame in the LCD area 112 and record a grayscale value of a target frame in the LCD area 112. Specifically, the target frame is the frame next to the current frame, and the image data input into the timing controller 120 includes a current grayscale value of the current frame and a target grayscale value of the target frame. The timing controller 120 is further configured to obtain a response time to convert the current grayscale value into the target grayscale value of the LCD area 112, so that a target grayscale value of the LED display area 111 can be adjusted to an actual grayscale value according to the response time.

In embodiments of the present disclosure, the timing controller 120 includes a memory configured to store a grayscale conversion response timetable of the LCD area 112. As shown in FIG. 2, a longitudinal axis of the grayscale conversion response timetable of the LCD area 112 represents the current grayscale value, and a horizontal axis represents the target grayscale value. The horizontal and longitudinal axes each include nine grayscale value fields to divide L0~L255 into these nine grayscale value fields. For each current grayscale value corresponding to each target grayscale value, a response time required to convert is prebuilt in milliseconds (ms). The grayscale conversion response timetable may be obtained by measuring the LCD area 112 by an optical instrument. For example, a rising time (i.e., response time) required to convert a grayscale value L0 into a grayscale value L32 is measured. In embodiments of the present disclosure, assuming that the rising of the grayscale value L0 to the grayscale value L32 is 0% to 100%, the rising of the grayscale value L0 to the grayscale value L32 being 10% to 90% is used as the response time recorded in the memory.

For example, if the current grayscale value of the current frame is L0 and the target grayscale value of the target frame is L32, a value corresponding to the two is 29.9, which means that the conversion response time required to convert the current grayscale value L0 into the target grayscale value L32 is at least 29.9 milliseconds. As a result, through the grayscale conversion response timetable prebuilt in the memory, the timing controller 120 may quickly obtain the response time required to convert the current grayscale value into the target grayscale value of the LCD area 112, so that the required actual grayscale value of the LED display area may be further calculated. Therefore, the brightness emitted by the LED display area 111 based on the actual grayscale value will be substantially the same as the brightness emitted by the LCD area 112 based on the target grayscale value.

Compared with previous spliced display applications, the difference in response time between the LED display area 111 and the LCD area 112 is not taken into account. When the timing controller 120 receives the target grayscale value of the target frame, the target grayscale value will be directly output to the display driver. Then the display driver drives the LED display area 111 and the LCD area 112 in the display area 110 respectively to emit a corresponding brightness according to the target grayscale value. Therefore, when the frame is converted, the response time of the LED display area 111 at the splice is shorter than the response time of the LCD area 112, resulting in the tearing sensation of the display screen in the display area 110.

In some embodiments, the longitudinal and horizontal axis fields of the grayscale conversion response timetable may be divided more finely or roughly. For example, the fields of the current grayscale values and the target grayscale values may allow every eight grayscale values to be built as the minimum unit, becoming L0, L8, L16, L32 . . . . LN and LN+8. Alternatively, the fields of the current grayscale values and target grayscale values may allow each grayscale value to be built completely into a database, that is, L0, L1, L2, L3 . . . LN and LN+1. In some embodiments, when some target grayscale values are not built in the horizontal axis field of the grayscale conversion response timetable, a maximum probable response time required for the target grayscale value may be obtained by an approximation method, or the response time required for the target grayscale value may be calculated by an interpolation method.

It should be specially explained that FIG. 2 illustrates an 8-bit 256 grayscale value. However, there are other embodiments of the present disclosure applicable to other types of grayscale values, such as a 10-bit 1024 grayscale value or 5-bit 32 grayscale value. In addition, considering the internal storage space of the memory, the field division of the current grayscale value and the target grayscale value may be adjusted according to application needs, and the present disclosure is not limited thereto.

It is worth noting that the present disclosure is mainly aimed at a situation that the grayscale conversion response time exceeds a frame period (that is, a display period of each frame), and then the target grayscale value of the LED display area 111 is adjusted. With FIG. 2 as an example, when a screen refresh rate (i.e., frame rate) is 120 Hertz (Hz), it means that the display period of each frame is 8.3 ms. Substantially, only the target grayscale value with response time of 8.3 ms or more needs to be adjusted. On the contrary, the target grayscale value with response time of less than 8.3 ms does not need to be adjusted to the actual grayscale value.

In a similar fashion, when the screen refresh rate is 60 Hz, it means that the display period of each frame is 16.67 ms. Substantially, only the target grayscale value with response time of 16.67 ms or more needs to be adjusted. On the contrary, the target grayscale value with response time of less than 16.67 ms does not need to be adjusted to the actual grayscale value. In some embodiments, the grayscale conversion response timetable is only built for the target grayscale value whose response time of grayscale conversion is greater than the frame period, which can save the internal storage space of the memory.

Figure 3:
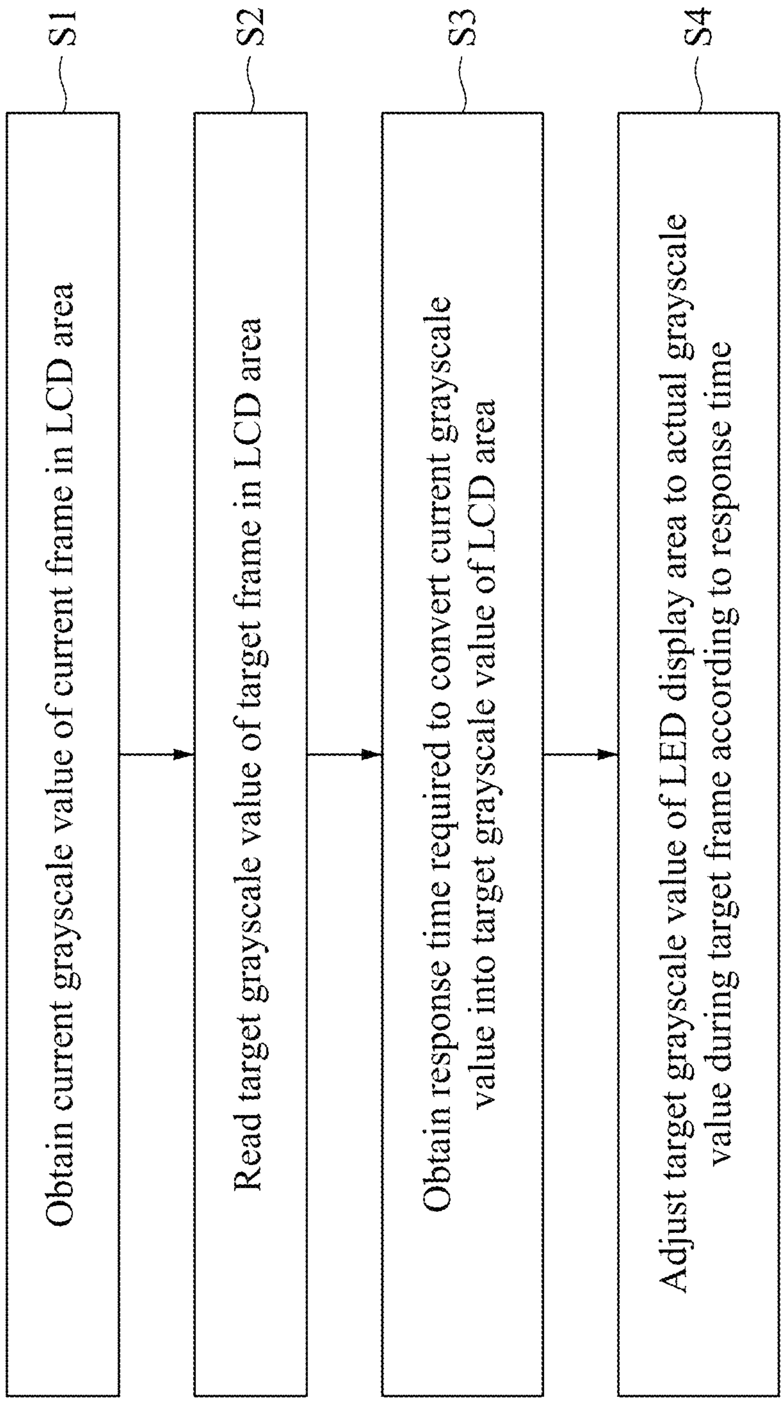
FIG. 3 is a flow diagram of a brightness control method of the spliced display device according to embodiments of the present disclosure.

Please continue to refer to FIG. 3, FIG. 3 is a flow diagram of a brightness control method 200 of the spliced display device according to embodiments of the present disclosure, and is used to solve the problem that the display frames has the tearing sensation due to different response times between the LED display area 111 and the LCD area 112 in each of the aforementioned display units. The brightness control method 200 mainly includes Steps S1-S4 and may be implemented through the configuration shown in FIG. 1 or other similar configurations. In the following, the brightness control method 200 is illustrated based on the configuration shown in FIG. 1, and is described with reference to FIGS. 4, 5A and 5B to better understand the present disclosure.

Figure 4:
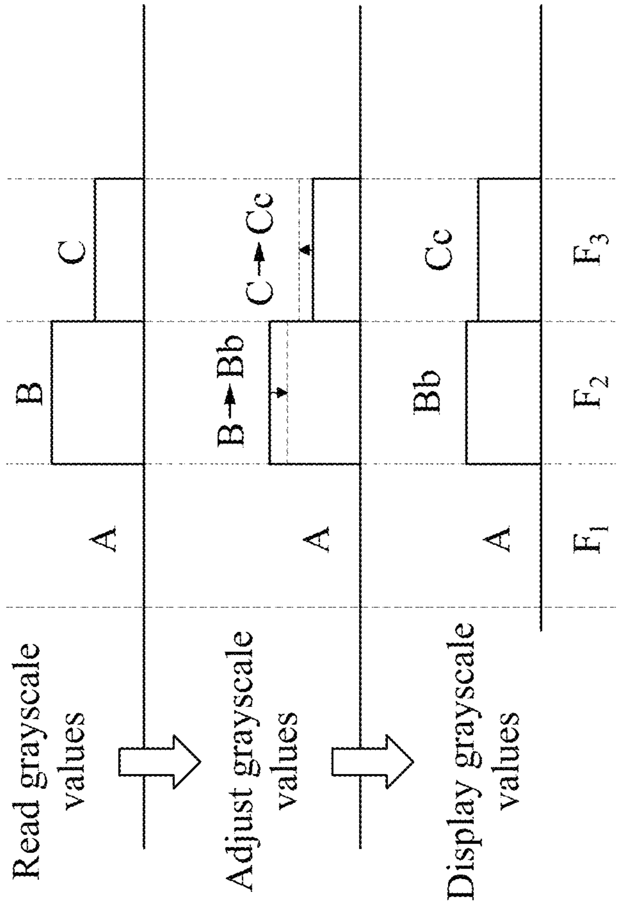
FIG. 4 is a schematic diagram of a brightness control method of the spliced display device according to embodiments of the present disclosure.

Please refer to FIGS. 3 and 4 together. At Steps S1 and S2, the timing controller 120 reads a first grayscale value A of a first frame $F_1$, a second grayscale value B of a second frame $F_2$ and a third grayscale value C of a third frame $F_3$ in the LCD area 112 according to an input image data. During the first frame $F_1$, the first grayscale value A of the first frame $F_1$ is regarded as the current grayscale value of the current frame, while the second grayscale value B of the second frame $F_2$ is regarded as the target grayscale value of the target frame. Similarly, during the second frame $F_2$, the second grayscale value B of the second frame $F_2$ is regarded as the current grayscale value of the current frame, while a third grayscale value C of a third frame $F_3$ is regarded as the target grayscale value of the target frame. In a similar fashion, during an $N^{th}$ frame, a grayscale value of the $N^{th}$ frame is regarded as the current grayscale value of the current frame, and a grayscale value of an $(N+1)^{th}$ frame is regarded as the target grayscale value of the target frame.

It should be noted that before the target grayscale value of the LED display area 111 is adjusted to the actual grayscale value, the grayscale values of the first frame $F_1$, the second frame $F_2$ and the third frame $F_3$ read by the LED display area 111 are substantially the same as the first grayscale value A, the second grayscale value B and the third grayscale value C of the LCD area 112 during the first frame $F_1$, the second frame $F_2$ and the third frame $F_3$.

At Steps S3 and S4, the timing controller 120 obtains a response time required to convert the current grayscale value into the target grayscale value of the LCD area 112 from the grayscale conversion response timetable shown in FIG. 2. For example, the first grayscale value A of the first frame $F_1$ is L0, the second grayscale value B of the second frame $F_2$ is L128, and the third grayscale value C of the third frame $F_3$ is L64. It can be seen from the grayscale conversion response timetable that the response time required to convert the first grayscale value A (grayscale value L0) into the second grayscale value B (grayscale value L128) is 11.4 ms. Therefore, the timing controller 120 can calculate an actual grayscale value Bb required for the LED display area 111 during the second frame $F_2$ based on the response time.

Specifically, before the LED display area 111 displays a brightness based on the second grayscale value B, the timing controller 120 has adjusted the second grayscale value B of the LED display area 111 during the second frame $F_2$ to the actual grayscale value Bb (grayscale value L97) in advance. Therefore, during the second frame $F_2$, the LED display area 111 displays brightness based on the actual grayscale value Bb.

After the second grayscale value B (grayscale value L128) of the LED display area 111 is adjusted to the actual grayscale value Bb (grayscale value L97), the third grayscale value C of the third frame $F_3$ in the LED display area 111 is further adjusted. At this time, the second grayscale value B of the second frame $F_2$ should take the actual grayscale value Bb (grayscale value L97) as the current grayscale value, rather than take the original second grayscale value B (grayscale value L128) as the current grayscale value.

Therefore, it can be seen from the grayscale conversion response timetable and the interpolation method that the response time required to convert the actual grayscale value Bb (grayscale value L97) into the third grayscale value C (grayscale value L64) is 9.1 ms. The timing controller 120 can calculate an actual grayscale value Cc required for the LED display area 111 during the third frame $F_3$ according to the response time, and further adjust the third grayscale value C of the LED display area 111 during the third frame $F_3$ to the actual grayscale value Cc (grayscale value L67). As a result, the grayscale value of the LED display area 111 eventually displayed during the second frame $F_2$ is Bb (grayscale value L97), and the grayscale value of the LED display area 111 eventually displayed during the third frame $F_3$ is Cc (grayscale value L67).

In detail, in the brightness control method 200, the target grayscale value of the LED display area 111 is adjusted to the actual grayscale value by obtaining a grayscale conversion response time of the LCD area 112, so that the brightness emitted by the LED display area 111 based on the actual grayscale value is substantially the same as the brightness emitted by the LCD area 112 based on the target grayscale value originally read. In this way, when the frames of the spliced display device 100 are converted, there will be no inconsistency in the brightness of the frames of the LED display area 111 and the LCD area 112 due to the difference in response time, and there will be no tearing sensation of the frames perceived by the user.

It is understood that in the brightness control method 200, the grayscale values of the LCD area 112 remain the same as the grayscale values originally read (i.e., the grayscale value of the first frame $F_1$ is A, the grayscale value of the second frame $F_2$ is B, and the grayscale value of the third frame $F_3$ is C). In other words, the brightness control method 200 does not change the grayscale value input to the LCD area 112, but causes the LCD area 112 to emit brightness based on the grayscale value read by the timing controller 120.

In embodiments of the present disclosure, the response time obtained at Step S3 further includes response time curves $C_1$ and $C_2$ that correspond to time-to-grayscale values, and Step S4 further includes calculating an effective brightness area of the response time curve $C_1$ during the second frame $F_2$, and calculating an effective brightness area of the response time curve $C_2$ during the third frame $F_3$.

Figure 5B:
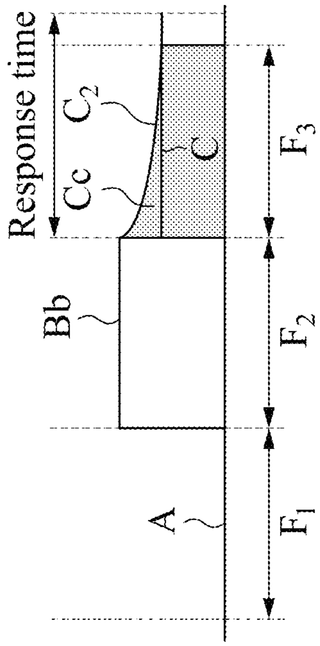
FIG. 5A and FIG. 5B are schematic diagrams of a response time curve of grayscale conversion and an effective brightness area according to embodiments of the present disclosure.
Figure 5A:
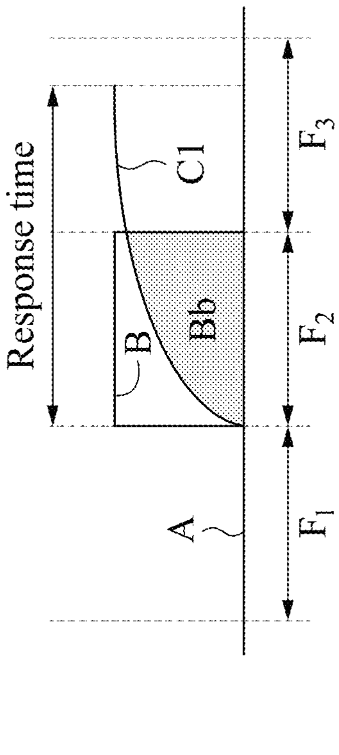

As shown in FIGS. 5A and 5B, a longitudinal axis represents the grayscale value, and a horizontal axis represents the display period of each frame. The effective brightness area of the response time curve $C_1$ during the second frame $F_2$ is the actual grayscale value required for the LED display area 111 during the second frame $F_2$. The effective brightness area of the response time curve $C_2$ during the third frame $F_3$ is the actual grayscale value required for the LED display area 111 during the third frame $F_3$. The response times and the response time curves $C_1$ and $C_2$ may be obtained by measuring the LCD area 112 with an optical instrument, and the response time curves $C_1$ and $C_2$ and the response times may correspond and are all prebuilt in the memory of the timing controller 120.

In detail, the timing controller 120 obtains, from the memory, a response time and the response time curve $C_1$ to convert the first grayscale value A into the second grayscale value B. Then, an effective brightness area of the response time curve $C_1$ during the second frame $F_2$ is further calculated as the actual grayscale value Bb. When the response time to convert the first grayscale value A into the second grayscale value B is greater than the display period of the second frame $F_2$, it means that the response time of the LCD area 112 is too slow, then the second grayscale value B of the LED display area 111 should be adjusted to the actual grayscale value Bb. On the contrary, when the response time to convert the first grayscale value A into the second grayscale value B is less than the display period of the second frame $F_2$, it means that the response time of the LCD area 112 is fast enough, and there is no need to adjust the target grayscale value of the LED display area 111.

In the example embodiment shown in FIG. 5A, the response time and the response time curve $C_1$ to convert the first grayscale value A into the second grayscale value B exceed the end time point of the second frame $F_2$, so the second grayscale value B of the LED display area 111 needs to be adjusted to the actual grayscale value Bb. As can be easily understood in FIG. 5A, a calculation interval of the effective brightness area is from a starting time point of the second frame $F_2$ to an ending time point of the second frame $F_2$.

Similar to the situation in FIG. 5A, in the example embodiment shown in FIG. 5B, since the second grayscale value B of the LED display area 111 has been adjusted to the actual grayscale value Bb, the timing controller 120 needs to obtain, from the memory, the response time and the response time curve $C_2$ to convert the actual grayscale value Bb of the second frame $F_2$ into the third grayscale value C. In this embodiment, the response time and the response time curve $C_2$ to convert the actual grayscale value Bb into the third grayscale value C exceed the ending time point of the third frame $F_3$, so the effective brightness area of the response time curve $C_2$ during the third frame $F_3$ needs to be further calculated based on the response time.

As can be easily understood in FIG. 5B, the calculation interval of the effective brightness area is from the starting time point of the third frame $F_3$ to the ending time point of the third frame $F_3$. Finally, the third grayscale value C of the LED display area 111 is adjusted to the actual grayscale value Cc. In this embodiment, the grayscale value of the LED display area 111 finally displayed during the second frame $F_2$ is Bb, and the grayscale value displayed during the third frame $F_3$ is Cc.

According to the spliced display device and the brightness control method thereof according to the present disclosure, by analyzing the response time of grayscale conversion of the LCD area, the target grayscale value of the LED display area can be adjusted to the actual grayscale value in advance before the LED display area emits the brightness based on the required target grayscale value of the next frame. As a result, the brightness emitted by the LED display area based on the actual grayscale value is substantially the same as the brightness emitted by the LCD area based on the target grayscale value. When the frames of the spliced display device are converted, the tearing sensation of the display screen due to the inconsistent response times between the LCD display area and the LED display area will not be caused.

Although the present disclosure has been disclosed as above in embodiments, the embodiments are not intended to limit the present disclosure, and those of ordinary skill in the art may make some changes and embellishments within the spirit and scope of the present disclosure, therefore, the scope of protection of the present disclosure shall be defined in the attached claims.

What is claimed is:

1. A brightness control method of a spliced display device, wherein the spliced display device comprises a plurality of display units, each of the display units comprises a light-emitting diode (LED) display area and a liquid crystal display (LCD) area, and the method comprises:
- obtaining a current grayscale value of a current frame in the LCD area;
- reading a target grayscale value of a target frame in the LCD area, wherein the target frame is a frame next to the current frame;
- obtaining a response time required to convert the current grayscale value into the target grayscale value of the LCD area; and
- adjusting a target grayscale value of the LED display area to an actual grayscale value during the target frame according to the response time;
- wherein during the target frame, a brightness emitted by the LED display area based on the actual grayscale value is the same as the brightness emitted by the LCD area based on the target grayscale value.

2. The brightness control method according to claim 1, wherein the current frame is a first frame, the target frame is a second frame, the actual grayscale value is used as a current grayscale value of the second frame in the LCD area, and the method further comprises:
- reading a target grayscale value of a third frame in the LCD area, wherein the third frame is a frame next to the second frame;
- obtaining a response time required to convert the current grayscale value of the second frame in the LCD area into the target grayscale value of the third frame in the LCD area; and
- adjusting a target grayscale value of the LED display area to an actual grayscale value during the third frame according to the response time;
- wherein during the third frame, the brightness emitted by the LED display area based on the actual grayscale value is the same as the brightness emitted by the LCD area based on the target grayscale value.

3. The brightness control method according to claim 1, further comprising:
- building a grayscale conversion response timetable to obtain the response time to convert the current grayscale value into the target grayscale value of the LCD area, wherein a longitudinal axis of the grayscale conversion response timetable comprises a plurality of current grayscale values, a horizontal axis of the grayscale conversion response timetable comprises a plurality of target grayscale values, and the plurality of current grayscale values correspond to each of the plurality of target grayscale values to build a plurality of response time values.

4. The brightness control method according to claim 1, wherein the response time comprises a response time curve that corresponds to time-to-grayscale values, and the step of adjusting the target grayscale value of the LED display area to the actual grayscale value during the target frame according to the response time further comprises:
- calculating an effective brightness area of the response time curve during the target frame as the actual grayscale value.

5. The brightness control method according to claim 4, wherein a calculation interval of the effective brightness area is from a starting time point of the target frame to an ending time point of the target frame.

6. The brightness control method according to claim 1, wherein the response time for converting the current grayscale value of the LCD area to the target grayscale value is greater than a display period of the target frame.

7. The brightness control method according to claim 1, wherein the response time is the time required to convert the current grayscale value to 10% to 90% of the target grayscale value.

8. The brightness control method according to claim 1, wherein the LED display area comprises a plurality of LEDs, and wherein the plurality of LEDs are one of a micro LED, a submillimeter LED, and an organic LED.

9. A spliced display device, comprising a plurality of display units, and each of the display units comprises:
- a light-emitting diode (LED) display area;
- a liquid crystal display (LCD) area spliced with the LED display area; and
- a timing controller configured to perform following steps comprising:
- obtaining a current grayscale value of a current frame in the LCD area;
- obtaining a target grayscale value of a target frame in the LCD area;
- obtaining a response time to convert the current grayscale value into the target grayscale value of the LCD area; and
- adjusting a target grayscale value of the LED display area to an actual grayscale value during the target frame according to the response time;
- wherein during the target frame, a brightness emitted by the LED display area based on the actual grayscale value is the same as the brightness emitted by the LCD area based on the target grayscale value.

10. The spliced display device according to claim 9, wherein the response time further comprises a response time curve that corresponds to time-to-grayscale values.

11. The spliced display device according to claim 10, wherein the response time curve comprises an effective brightness area during a display period of the target frame, and the effective brightness area is the actual grayscale value.

12. The spliced display device according to claim 11, wherein a calculation interval of the effective brightness area is from a starting time point of the target frame to an ending time point of the target frame.

13. The spliced display device according to claim 9, wherein the response time to convert the current grayscale value into the target grayscale value of the LCD area is greater than a display period of the target frame.

14. The spliced display device according to claim 9, wherein the timing controller further comprises:

a memory, configured to store a grayscale conversion response timetable, wherein a longitudinal axis of the grayscale conversion response timetable comprises a plurality of current grayscale values, a horizontal axis comprises a plurality of target grayscale values, and the plurality of current grayscale values correspond to each of the plurality of target grayscale values to build a plurality of response time values.

15. The spliced display device according to claim 9, wherein the response time is the time required to convert the current grayscale value to 10% to 90% of the target grayscale value.

16. The spliced display device according to claim 9, wherein the LED display area comprises a plurality of LEDs, and wherein the plurality of LEDs are one of a micro LED, a submillimeter LED, and an organic LED.

* * * * *